United States Patent
Liu et al.

(10) Patent No.: US 12,014,536 B2
(45) Date of Patent: Jun. 18, 2024

(54) TARGET DETECTION METHOD AND DEVICE FOR HIGH-RESOLUTION REMOTE SENSING IMAGE

(71) Applicant: ZHEJIANG LAB, Zhejiang (CN)

(72) Inventors: Zhende Liu, Hangzhou (CN); Wuyue Zhang, Hangzhou (CN); Peng Liu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/464,249

(22) Filed: Sep. 10, 2023

(65) Prior Publication Data

US 2023/0419639 A1 Dec. 28, 2023

Related U.S. Application Data

(63) Continuation of application No. PCT/CN2023/088349, filed on Apr. 14, 2023.

(30) Foreign Application Priority Data

May 5, 2022 (CN) .......................... 202210480814.4

(51) Int. Cl.
G06V 10/762 (2022.01)
G06T 7/62 (2017.01)
(Continued)

(52) U.S. Cl.
CPC .............. *G06V 10/762* (2022.01); *G06T 7/62* (2017.01); *G06V 10/26* (2022.01);
(Continued)

(58) Field of Classification Search
CPC .. G06V 10/762; G06V 10/26; G06V 2201/07; G06V 20/13; G06V 2207/20081; G06T 7/62
(Continued)

(56) References Cited

U.S. PATENT DOCUMENTS

2013/0182002 A1* 7/2013 Macciola ............... G06V 10/25
345/589
2019/0273910 A1 9/2019 Malaika
2022/0122341 A1 4/2022 Liu

FOREIGN PATENT DOCUMENTS

CN 102043958 A 5/2011
CN 108337399 A 7/2018
(Continued)

OTHER PUBLICATIONS

International Search Report (PCT/CN2023/088349); Date of Mailing: Jun. 21, 2023.
(Continued)

*Primary Examiner* — Michael R Neff
(74) *Attorney, Agent, or Firm* — W&G Law Group

(57) ABSTRACT

The present application discloses a target detection method and device for a high-resolution remote sensing image, which comprises: acquiring an original high-resolution remote sensing image from a sensor; acquiring target information of an area and an expanded area of the area expanding around by a predetermined distance; adaptively partitioning the original high-resolution remote sensing image to obtain different cluster areas to be detected, and obtaining an area required to be detected and an area not required to be detected; selecting a model of the area required to be detected and generating a target detection scheme; executing the target detection scheme to obtain a detection result; determining whether a computing platform has extra computing resources to detect the area not required to be detected, if so, performing dynamic partition detection for the area to obtain a detection result, and merging the detection results into a target detection result.

8 Claims, 5 Drawing Sheets

(51) Int. Cl.
*G06V 10/26* (2022.01)
*G06V 20/13* (2022.01)

(52) U.S. Cl.
CPC .... *G06T 2207/20081* (2013.01); *G06V 20/13* (2022.01); *G06V 2201/07* (2022.01)

(58) Field of Classification Search
USPC .......................................................... 382/103
See application file for complete search history.

(56) References Cited

FOREIGN PATENT DOCUMENTS

| CN | 108445480 A | 8/2018 |
|---|---|---|
| CN | 109416728 A | 3/2019 |
| CN | 109902627 A | 6/2019 |
| CN | 109948415 A | 6/2019 |
| CN | 110390292 A | 10/2019 |
| CN | 112132093 A | 12/2020 |
| CN | 112199984 A | 1/2021 |
| CN | 112381053 A | 2/2021 |
| CN | 112668390 A | 4/2021 |
| CN | 113239815 A | 8/2021 |
| CN | 113705532 A | 11/2021 |
| CN | 113971653 A | 1/2022 |
| CN | 114244904 A | 3/2022 |
| CN | 114581781 A | 6/2022 |

OTHER PUBLICATIONS

First Office Action(CN202210480814.4); Date of Mailing: Jun. 17, 2022.

Notice Of Allowance(CN202210480814.4); Date of Mailing: Jun. 27, 2022.

Moving-object-detection-and-tracking Wei et al.; Journal of Bohai University, vol. 38, No. 4; Dec. 2017; pp. 370-377.

Aircraft-target-detection-based-on-feature-pyramid-in-high-resolution-remote-sensing-image Zhang et al.; China Academic Journal Electronic Publishing House, Jul. 31, 2018, pp. 1-8.

Wavelet-differencel-reduction-region-of-interest-priority-in-multispectral-video -small target-detection Law et al.; IEEE International Conference on Image Processing, 2004, pp. 1903-1906.

An-experiment-based-quantitative-and-comparative-analysis-of-target-detection-and-image-classification-algorithms-for-hyperspectral-imagery Chang et al.; IEEE Transactions on Geoscience and Remote Sensing, vol. 38, No. 2; Mar. 2000; pp. 1044-1063.

* cited by examiner

TARGET DETECTION METHOD AND DEVICE FOR HIGH-RESOLUTION REMOTE SENSING IMAGE

CROSS-REFERENCE TO RELATED APPLICATIONS

The present application is a continuation of International Application No. PCT/CN2023/088349, filed on Apr. 14, 2023, which claims priority to Chinese Application No. 202210480814.4, filed on May 5, 2022, the contents of both of which are incorporated herein by reference in their entireties.

TECHNICAL FIELD

The present application relates to the field of deep learning technology and remote sensing image processing and in particular, to a target detection method and a device for a high-resolution remote sensing image.

BACKGROUND

With the progress of sensor technology and space remote sensing technology, the demand for target detection in remote sensing images is constantly increasing. Remote sensing satellites are generally located at an altitude of 300 to 2000 kilometers with an orbital period of about 90 minutes. Targets of various sizes Non-uniformly distributed on the earth's surface can be accurately observed at meter or even sub-meter level spatial resolution through high-resolution remote sensing. Data of the high-resolution remote sensing images has been widely used in mapping, urban planning, transportation, water conservancy, agriculture, forestry, environmental resources monitoring, military, and other fields. However, due to the large high-resolution image and the bandwidth limitation of air-ground communication, all remote sensing images cannot be transmitted back to the ground for processing. Spaceborne or airborne platforms generally process the data of the remote sensing images in real-time through the edge computing platform, and then return the results or key areas for processing.

It is quite common to use deep learning target detection model to process images. Most target detection models are designed with low-resolution input. The common methods of high-resolution image target detection are to adjust the image size, segment the image or expand the input resolution of the network. Adjusting the image size and image segmentation will affect the accuracy thereof.

In the process of achieving the present disclosure, the inventors found that there are at least the following problems in the prior art:

Expanding the input resolution will lead to a slower speed of model training and reasoning, and also increase power consumption per unit time; these processing methods are not suitable for edge computing platforms with limited resources. The present disclosure provides a target detection method using different models for different areas after self-adaptive division of high-resolution remote sensing images, so as to improve the image target detection accuracy of a computing system and the energy efficiency of the system.

SUMMARY

The object of the embodiment of the application is to provide a target detection method and device for a high-resolution remote sensing image, so as to solve the technical problems of large resource occupation and low calculation efficiency in related technologies.

According to a first aspect of an embodiment of the present application, there is provided a target detection method for a high-resolution remote sensing image; the method is applied to a computing platform and includes the following steps:

acquiring an original high-resolution remote sensing image from a sensor;

acquiring, from a historical detection result, target information of an area corresponding to the original high-resolution remote sensing image and an expanded area of the area expanding around by a predetermined distance;

adaptively partitioning the original high-resolution remote sensing image to obtain different cluster areas to be detected according to the target information, and then obtaining an area required to be detected and an area not required to be detected;

selecting a model of the area required to be detected and generating a target detection scheme of the area required to be detected;

executing the target detection scheme to obtain a detection result of the area required to be detected; and determining whether a computing platform has extra computing resources to detect the area not required to be detected, when the computing platform has extra computing resources, performing dynamic partition detection of the area not required to be detected to obtain a detection result of the area not required to be detected, and merging the detection results of the area required to be detected and the area not required to be detected into a target detection result, when the computing platform does not have extra computing resources, taking the detection result of the area required to be detected as the target detection result.

Further, before the step of acquiring an original high-resolution remote sensing image from a sensor, the method further includes:

off-line training target detection models suitable for different densities and sizes, and measuring delay and detection accuracies of different models on the computing platform, and loading the models and the corresponding delay and detection accuracies on the computing platform.

Further, after obtaining the target detection result, the method further includes:

updating the historical detection result stored on the computing platform according to the target detection result.

Further, the step of adaptively partitioning the original high-resolution remote sensing image to obtain different cluster areas to be detected according to the target information, and then obtaining an area required to be detected and an area not required to be detected includes:

S21, performing clustering according to targets and positions of the targets, and calculating an initial value of a number of clustered categories, wherein the target information comprises the positions, sizes and categories of the targets;

S22, executing a clustering algorithm according to the initial value of the number of the clustered categories to obtain a corresponding number of clusters;

S23, constructing a bounding rectangle for each cluster, and calculating a side length of the rectangle and a density of the targets in the rectangle;

S24: updating the initial value of the number of the clustered categories and returning to step S22 for re-clustering when the side length of the rectangle exceeds a side length threshold and the density of the targets in the rectangle exceeds a density threshold; otherwise, selecting a model set capable of processing the density and the size according to the density and the size of the targets; and S25, calculating areas where the targets may appear in the clusters by combining motion information of the targets, and setting the areas as cluster areas to be detected, wherein the area required to be detected is composed of all the cluster areas to be detected, an area which is not the area required to be detected in the original high-resolution remote sensing image is the area not required to be detected, and the motion information of the targets is stored on the computing platform.

Further, the step of selecting a model of the area required to be detected and generating a target detection scheme of the area required to be detected includes:

S31, selecting the model set capable of processing the density and the size according to the density and the size of the targets;

S32, evenly dividing one cluster area to be detected according to different input sizes of the models in the model set to generate at least one model combination feasible for the cluster area to be detected;

S33, executing S32 for each cluster area to be detected in the area required to be detected, and forming at least one model scheme after combining the models of all cluster areas to be detected;

S34, calculating an accuracy and a total delay of each model scheme for detecting the area required to be detected according to the accuracy and delay information of each model scheme;

S35, selecting a scheme the total delay of the scheme meets a delay limitation of the computing platform among all the model schemes as a target detection scheme of the area required to be detected in a manner of overall accuracy priority.

According to a second aspect of an embodiment of the present application, there is provided a target detection device for a high-resolution remote sensing image; the device is applied to a computing platform and includes:

a first acquiring module configured for acquiring an original high-resolution remote sensing image from a sensor;

a second acquiring module configured for acquiring, from a historical detection result, target information of an area corresponding to the original high-resolution remote sensing image and an expanded area of the area expanding around by a predetermined distance;

a partitioning module configured for adaptively partitioning the original high-resolution remote sensing image to obtain different cluster areas to be detected according to the target information, and then obtaining an area required to be detected and an area not required to be detected;

a generating module configured for selecting a model of the area required to be detected and generating a target detection scheme of the area required to be detected;

an executing module configured for executing the target detection scheme to obtain a detection result of the area required to be detected; and a detecting module configured for determining whether a computing platform has extra computing resources to detect the area not required to be detected, when the computing platform has extra computing resources, performing dynamic partition detection for the area not required to be detected to obtain a detection result of the area not required to be detected, and merging the detection results of the area required to be detected and the area not required to be detected into a target detection result, when the computing platform does not have extra computing resources, taking the detection result of the area required to be detected as the target detection result.

According to a third aspect of an embodiment of the present application, there is provided electronic equipment, including:

one or more processors;

a memory for storing one or more programs;

when the one or more programs are executed by the one or more processors, the one or more processors implements the target detection method for a high-resolution remote sensing image according to the first aspect.

According to a fourth aspect of an embodiment of the present application, there is provided a computer-readable storage medium on which computer instructions are stored; the instructions, when executed by a processor, implements the steps of the target detection method for a high-resolution remote sensing image according to the first aspect.

The technical scheme provided by the embodiment of the application can include the following beneficial effects:

As can be seen from the above embodiments, the application obtains the target information in the corresponding area and the expanded area of the image with reference to the historical detection result, thereby reducing the calculation resources used in obtaining the target information; according to the target information, adaptive partitioning and graded processing of the area required to be detected and the area not required to be detected are realized, so that the area required to be detected detection is completed first, thus avoiding wasting resources in detecting target-free areas, improving the overall detection accuracy and speeding up the target detection.

It is to be understood that both the foregoing general description and the following detailed description are exemplary and explanatory only and are not restrictive of the present application.

BRIEF DESCRIPTION OF DRAWINGS

The accompanying drawings, which are incorporated in and constitute a part of this specification, illustrate embodiments consistent with this application and together with the specification, serve to explain the principles of this application.

DESCRIPTION OF EMBODIMENTS

Reference will now be made in detail to exemplary embodiments, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with this application. Rather, they are merely examples of devices and methods consistent with some aspects of the present application as detailed in the appended claims.

The terminology used in this application is for the purpose of describing specific embodiments only and is not intended to limit this application. The singular forms "a", "said" and "the" used in this application and the appended claims are also intended to include the plural forms, unless the context clearly indicates other meaning. It should also be understood that the term "and/or" as used herein refers to and includes any or all possible combinations of one or more associated listed items.

It should be understood that although the terms first, second, third, etc. may be used in this application to describe various information, this information should not be limited to these terms. These terms are only used to distinguish the same type of information from each other. For example, without departing from the scope of this application, the first piece of information can also be called the second piece of information, and similarly, the second piece of information can also be called the first piece of information. Depending on the context, the word "if" as used herein can be interpreted as "when" or "in case of" or "in response to a determination".

Figure 1:
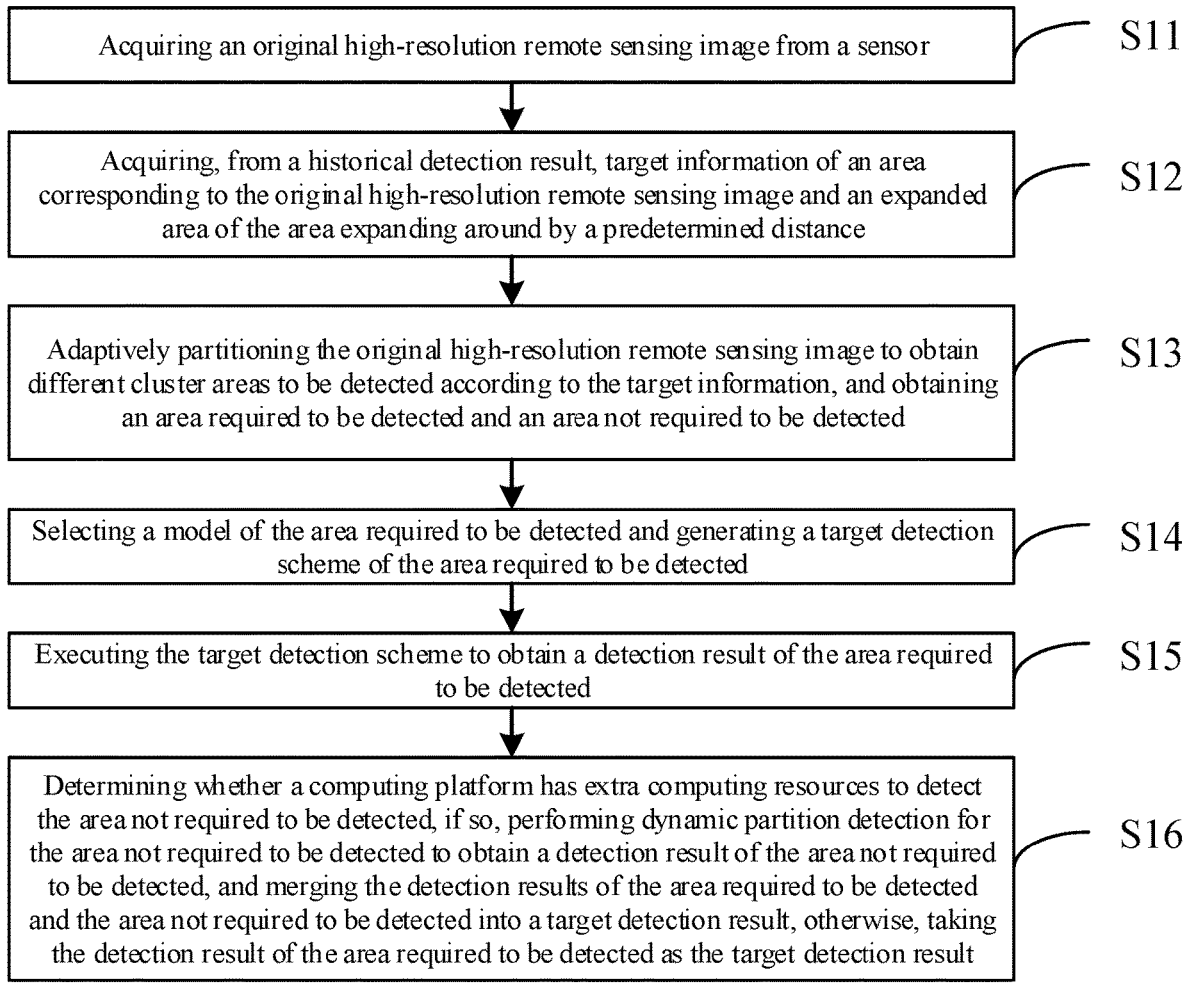
FIG. 1 is a flowchart of a target detection method for a high-resolution remote sensing image according to an exemplary embodiment.

FIG. 1 is a flowchart of a target detection method for a high-resolution remote sensing image according to an exemplary embodiment. As shown in FIG. 1, the method is applied to a computing platform and may include the following steps:

S11, acquiring an original high-resolution remote sensing image from a sensor;

S12, acquiring, from a historical detection result, target information of an area corresponding to the original high-resolution remote sensing image and an expanded area of the area expanding around by a predetermined distance;

S13, adaptively partitioning the original high-resolution remote sensing image to obtain different cluster areas to be detected according to the target information, and then obtaining an area required to be detected and an area not required to be detected;

S14, selecting a model of the area required to be detected and generating a target detection scheme of the area required to be detected;

S15, executing the target detection scheme to obtain a detection result of the area required to be detected; and S16, determining whether a computing platform has extra computing resources to detect the area not required to be detected, when the computing platform has extra computing resources, performing dynamic partition detection for the area not required to be detected to obtain a detection result of the area not required to be detected, and merging the detection result of the area required to be detected and the detection result of the area not required to be detected into a target detection result, when the computing platform does not have extra computing resources, taking the detection result of the area required to be detected as the target detection result.

As can be seen from the above embodiments, the application obtains the target information in the corresponding area and the expanded area of the image with reference to the historical detection result, thereby reducing the calculation resources used in obtaining the target information; according to the target information, adaptive partitioning and graded processing of the area required to be detected and the area not required to be detected are realized, so that the area required to be detected detection is completed first, thus avoiding wasting resources in detecting target-free areas, improving the overall detection accuracy and speeding up the target detection.

In concrete implementation, the computing platform refers to the hardware devices that can run the deep neural network model, including but not limited to artificial intelligence processors, CPU, GPU, FPGA and other devices.

Before step S11, the method may further include:
off-line training target detection models suitable for different densities and sizes, and measuring delay and detection accuracies of different models on the computing platform, and loading the models and the corresponding delay and detection accuracies on the computing platform.

In some embodiments, models with different target densities and different input sizes are trained for remote sensing target detection on an off-line computer. The trained models are loaded in a computing platform, and images with corresponding sizes and densities are input, and the delay and detection accuracy of each model on the computing platform are tested experimentally. Off-line training and experimental testing of the delay and accuracy of each model are beneficial to accurately budget the computing resources needed by the model in actual operation, so as to obtain the best detection results with limited computing resources. The computing platform is also provided with target motion information, an edge length threshold and a density threshold for detecting whether the clustering result is reasonable, so that the area of the area required to be detected can be judged more accurately according to the actual target motion information, and the setting of the edge length threshold and the density threshold can judge whether the target clustering result is reasonable, so as to avoid being influenced by abnormal points and local high density during clustering, and their settings can effectively avoid missing detection and wasting computing resources for over-detection.

In the concrete implementation of step S11, an original high-resolution remote sensing image is obtained from a sensor.

In some embodiments, high-resolution images captured by optical and radar imaging loads carried by satellites are read into the storage space of the computing platform.

In the concrete implementation of step S12, the target information in the area corresponding to the original high-resolution remote sensing image and the expanded area of the area expanding around by a predetermined distance is obtained from the historical detection results.

In some embodiments, according to the geographical position of the original high-resolution image, the target detection information of a historical remote sensing image corresponding to the same geographical position is obtained, including the size, geographical position and target category of the target; at the same time, according to the geographical position of the original high-resolution image, the target detection information of the remote sensing image of the expanded area of the area expanding around by a predetermined distance is obtained, including the size, geographical position and target category of the target; the mode of expanding the area by a predetermined distance around is as follows: multiplying the set target moving speed threshold by the moving period length of the satellite corresponding to the original high-resolution remote sensing image to obtain the moving distance of the target in a period, and the expanded area being the area of the area expanding around by a periodic moving distance of the target. Through this design, the possible target position in the periodic remote sensing image can be predicted by combining historical detection information, which can assist the adaptive partition algorithm; a the same time, combined with the target detection information in the expanded area, it can avoid the omission of information of new targets moving from outside the area to inside the area assist the adaptive partition algorithm.

In the concrete implementation, if there is no historical detection result, the whole image is regarded as an area not required to be detected, and the dynamic partition detection of the area not required to be detected is performed.

In the concrete implementation of step S13, according to the target information, the original high-resolution remote sensing image is adaptively partitioned to obtain different cluster areas to be detected, and then the area required to be detected and the area not required to be detected are obtained.

Figure 2:
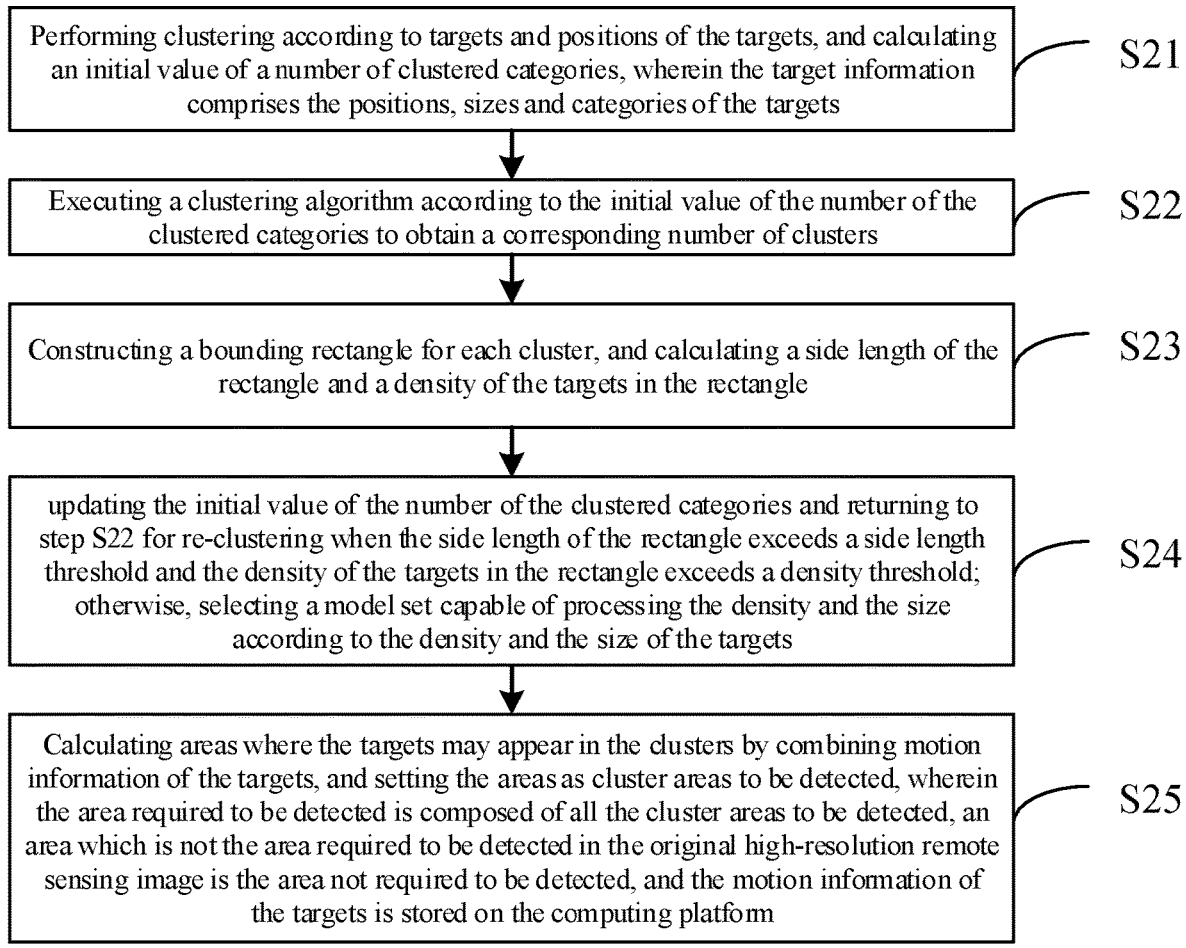
FIG. 2 is a flowchart of step S13 according to an exemplary embodiment.

In some embodiments, as shown in FIG. 2, this step may include the following sub-steps:

Step 21, performing clustering according to targets and positions of the targets, and calculating an initial value of a number of clustered categories, wherein the target information comprises the positions, sizes and categories of the targets.

In some embodiments, the adaptive partitioning of the remote sensing image is realized by a clustering algorithm, in which the initial value of the number of categories of the clusters can be calculated according to the number of targets in this area in historical information, and the clustering algorithm may include k-means clustering, hierarchical clustering and other algorithms.

S22, executing a clustering algorithm according to the initial value of the number of the clustered categories to obtain a corresponding number of clusters.

In some embodiments, according to the initial value of the number of the categories, a clustering algorithm is executed, and the category result obtained by each clustering is used as a cluster; this step can cluster all possible targets in the remote sensing image and assist in judging the density of the partition to which the target belongs.

S23, constructing a bounding rectangle for each cluster, and calculating a side length of the rectangle and a density of the targets in the rectangle.

In some embodiments, a bounding rectangle is constructed for each cluster obtained after clustering, the horizontal distance between the two farthest targets in the horizontal direction in the cluster is the width of the bounding rectangle, and the vertical distance between the two farthest targets in the vertical direction in the cluster is the height of the bounding rectangle; the constructed bounding rectangle should be the smallest rectangle containing all points in the cluster, and the target density of the cluster is calculated by the side length of the bounding rectangle and the number of targets in the rectangle.

S24, updating the initial value of the number of the clustered categories and returning to step S22 for re-clustering when the side length of the rectangle exceeds a side length threshold and the density of the targets in the rectangle exceeds a density threshold; otherwise, selecting a model set capable of processing the density and the size according to the density and the size of the targets.

In some embodiments, by comparing the preset density threshold with the density of the targets in the bounding rectangle, if the density in the rectangle has exceeded the density threshold, but the length of one side of the bounding rectangle exceeds the preset edge length threshold, it indicates that the targets of the cluster are too scattered in the horizontal or vertical direction, and it is necessary to re-cluster by updating the number of clusters; judging the distribution of the targets in the bounding rectangular can verify the effectiveness of clustering and prevent some abnormal points from being misclassified.

S25, calculating areas where the targets may appear in the clusters by combining motion information of the targets, and setting the areas as cluster areas to be detected, wherein the area required to be detected is composed of all the cluster areas to be detected, an area which is not the area required to be detected in the original high-resolution remote sensing image is the area not required to be detected, and the motion information of the targets is stored on the computing platform.

In some embodiments, according to the position information of the target in the area and the motion information of the target in the historical detection information, the position of each target in the clustered cluster can be expanded by motion to obtain the expanded target area, which is the waiting area of the cluster. After all clusters are expanded, the waiting areas of all clusters together form the areas required to be detected. The area in the original high-resolution remote sensing image except the area required to be detected is a area not required to be detected. Wherein, the mode of motion expansion of the cluster according to the targets in the cluster is as follows: multiplying the motion speed of each target in the cluster by the motion period length of the satellite corresponding to the high-resolution remote sensing image to obtain the motion distance of each target in the cluster in a period; the expanded area is the area obtained after each target in the cluster is expanded by a periodic moving distance by combining the geographical position information of each target in the cluster; the expansion of the possible area of the target can prevent the missed detection because the target moves away from the original area.

In the concrete implementation, if there is a cluster area to be detected that exceeds the area of the current image, in this case, the exceeding area will be recorded as the area required to be detected for the calculation of adjacent images.

In the concrete implementation of step S14, the model selection of the area required to be detected is carried out to generate the target detection scheme of the area required to be detected.

Figure 3:
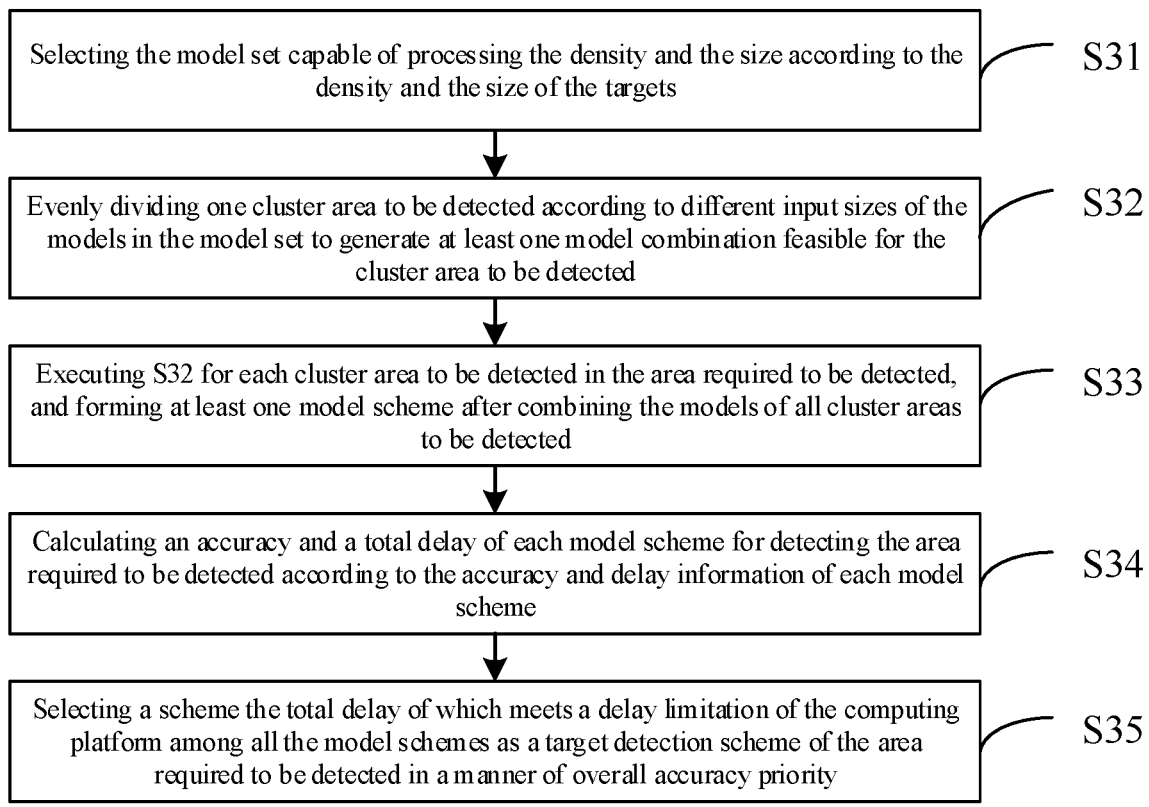
FIG. 3 is a flowchart of step S14 according to an exemplary embodiment.

In some embodiments, as shown in FIG. 3, this step may include the following sub-steps:

S31, selecting the model set capable of processing the density and the size according to the density and the size of the targets.

In some embodiments, according to the density of the rectangle calculated in S23 and the size of the target obtained in the historical information, the information of all models in the computing platform is traversed, and the model set that can be used to calculate the density and model size is retrieved; using corresponding models for targets with different densities and sizes can effectively improve the detection accuracy and save computing resources.

S32, evenly dividing one cluster area to be detected according to different input sizes of the models in the model set to generate at least one model combination feasible for the cluster area to be detected.

In some embodiments, if the size of the cluster area to be detected is 1024*1024, one model with an input size of 1024*1024 or four models with an input size of 512*512 can be used.

S33, executing S32 for each cluster area to be detected in the area required to be detected, and forming at least one model scheme after combining the models of all cluster areas to be detected.

In some embodiments, each cluster area to be detected has one or more available models, and after combining all the available models in the cluster areas to be detected, one or more target detection model schemes are constructed for the whole image.

S34, calculating an accuracy and a total delay of each model scheme for detecting the area required to be detected according to the accuracy and delay information of each model scheme.

In some embodiments, according to the delay and accuracy of each model and the number of uses of each model, the total delay is weighted and summed with the number of uses as the weight, and the total accuracy is weighted and averaged with the number of uses as the weight.

S35, selecting a scheme the total delay of the scheme meets a delay limitation of the computing platform among all the model schemes as a target detection scheme of the area required to be detected in a manner of overall accuracy priority.

In some embodiments, the model schemes are traversed from high to low in total accuracy, and the model scheme with a total delay less than the delay limit of the computing platform is selected; if there are schemes with the same total accuracy, the model scheme with a small total delay is preferred; the selected model scheme ensures the highest detection accuracy and does not exceed the delay limit of the computing platform.

In the concrete implementation of step S15, the target detection scheme is executed to obtain the detection result of the area required to be detected.

In some embodiments, the model scheme has been determined, that is, the models to be used in different areas of the image have been determined; if the computing platform supports parallel computing, each model and the corresponding image area can be executed in parallel; if parallel computing is not supported, the models and corresponding image areas are executed in series.

In the concrete implementation of step S16, it is judged whether the computing platform has extra computing resources to detect the area not required to be detected, if so, the dynamic partition detection of the area not required to be detected is carried out to obtain the detection result of the area not required to be detected, and the detection result of the area required to be detected and the detection result of the area not required to be detected are combined into the target detection result; otherwise, the detection result of the area required to be detected is taken as the target detection result.

In some embodiments, the total delay of the executed model scheme is subtracted according to the limitation of the computing platform, and the delay residual is calculated.

If the delay residual is less than the minimum delay in the model loaded by the computing platform, the area not required to be detected is not detected.

If the delay residual is greater than the minimum delay in the model loaded on the computing platform, the area not required to be detected is detected. Through the boundary of area not required to be detected, delay residue, the input size of each model and delay of each model as inputs, the model scheme to maximize the detection area under the limitation of the boundary of the area not required to be detected and delay residue is calculated through dynamic programming algorithm. If the computing platform supports parallel computing, the model scheme can be executed in parallel. If parallel computing is not supported, each model in the model scheme is executed in series, and the detection results of the area not required to be detected and the detection results of the area required to be detected are merged.

This design is to maximize the area of area not required to be detected under the limitation of the delay residual, which can reduce the possibility of missing detection of the target and maximize the use of computing resources.

Figure 4:
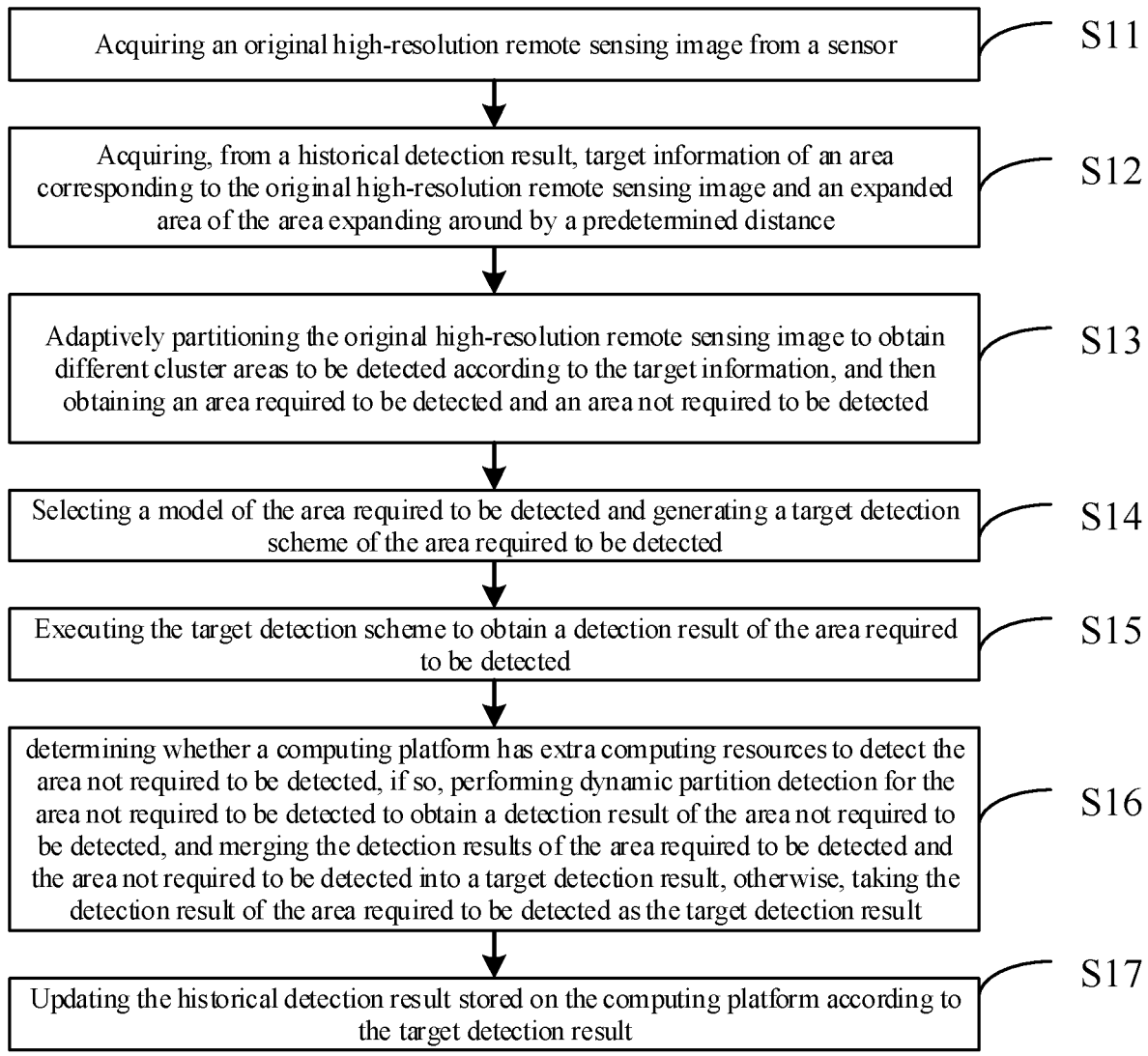
FIG. 4 is a flowchart of a target detection method for a high-resolution remote sensing image according to an exemplary embodiment.

In some embodiments, as shown in FIG. 4, after the target detection result is obtained in step S16, the method may further include:

Step S17, updating the historical detection result stored on the computing platform according to the target detection result.

In some embodiments, the target in the corresponding area of the image is detected through the above calculation, all the targets previously corresponding to the area are deleted from the historical detection results stored on the computing platform, and the latest target detection results are written; in the concrete implementation, the updated historical detection results can also be transmitted to the satellite computer system for processing.

Corresponding to the aforementioned embodiment of the target detection method for a high-resolution remote sensing image, the application also provides an embodiment of a target detection device for a high-resolution remote sensing image.

Figure 5:
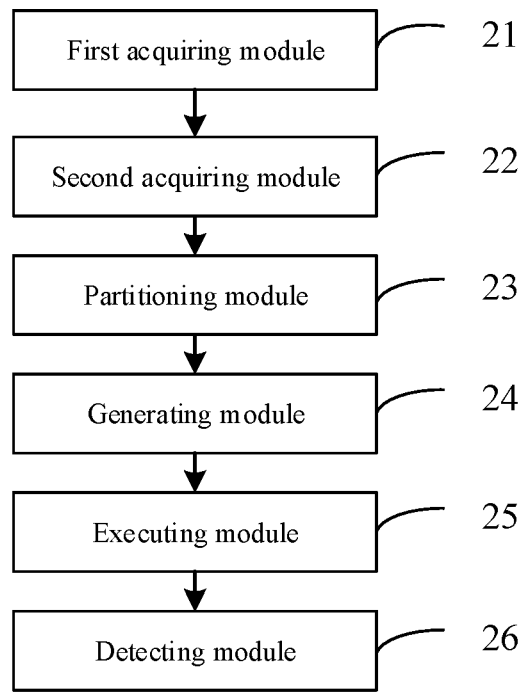
FIG. 5 is a block diagram of a target detection device for a high-resolution remote sensing image according to an exemplary embodiment.

FIG. 5 is a block diagram of a target detection device for a high-resolution remote sensing image according to an exemplary embodiment. Referring to FIG. 5, the device includes:

a first acquiring module 21 configured for acquiring an original high-resolution remote sensing image from a sensor;

a second acquiring module 22 configured for acquiring, from a historical detection result, target information of an area corresponding to the original high-resolution remote sensing image and an expanded area of the area expanding around by a predetermined distance;

a partitioning module 23 configured for adaptively partitioning the original high-resolution remote sensing image to obtain different cluster areas to be detected according to the target information, and then obtaining an area required to be detected and an area not required to be detected;

a generating module 24 configured for selecting a model of the area required to be detected and generating a target detection scheme of the area required to be detected;

an executing module 25 configured for executing the target detection scheme to obtain a detection result of the area required to be detected; and a detecting module 26 configured for determining whether a computing platform has extra computing resources to detect the area not required to be detected, when the computing platform has extra computing resources, performing dynamic partition detection for the area not required to be detected to obtain a detection result of the area not required to be detected, and merging the detection result of the area required to be detected and the detection result of the area not required to be detected into a target detection result, when the computing platform does not have extra computing resources, taking the detection result of the area required to be detected as the target detection result.

With regard to the device in the above embodiment, the specific way in which each module performs operations has been described in detail in the embodiment of the method, and will not be described in detail here.

For the device embodiment, because it basically corresponds to the method embodiment, it is only necessary to refer to part of the description of the method embodiment for the relevant points. The device embodiment described above is only schematic, in which the units described as separate components may or may not be physically separated, and the components displayed as units may or may not be physical units, that is, they may be located in one place or distributed to multiple network units. Some or all of the modules can be selected according to the actual needs to achieve the purpose of the application solution. Those having ordinary skill in the art can understand and implement the present application without creative labor.

Figure 6:
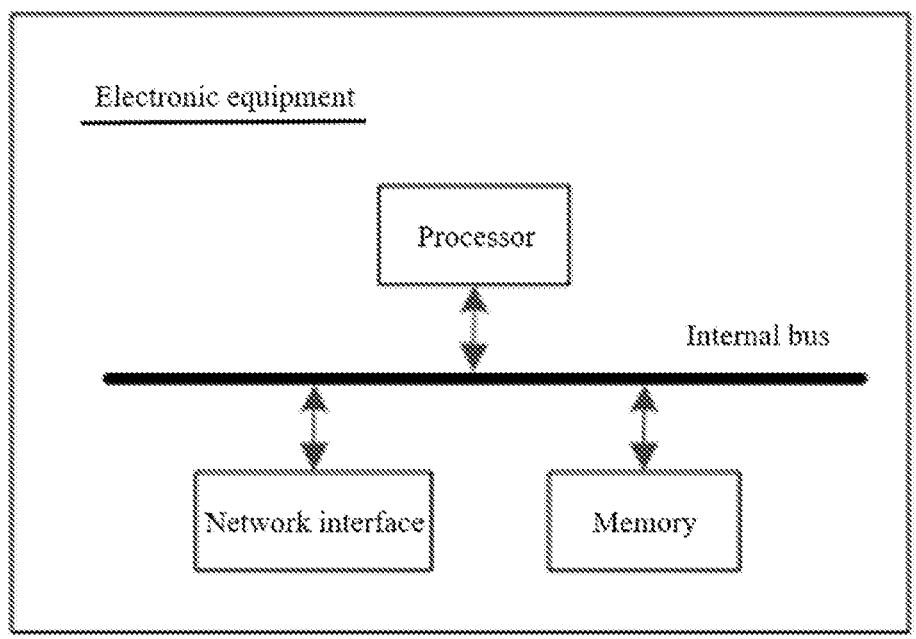
FIG. 6 is a schematic diagram of electronic equipment according to an exemplary embodiment.

Correspondingly, the application also provides electronic equipment, which includes one or more processors; a memory for storing one or more programs; when the one or more programs are executed by the one or more processors, the one or more processors implements the target detection method for a high-resolution remote sensing image as described above. As shown in FIG. 6, it is a hardware structure diagram of any equipment with data processing capability where the target detection method for a high-resolution remote sensing image provided by the embodiment of the present application is located. In addition to the processor, memory and network interface shown in FIG. 6, any equipment with data processing capability where the device in the embodiment is located may also include other hardware according to the actual functions of the equipment with data processing capability, which is not repeated here.

Correspondingly, the application also provides a computer-readable storage medium, on which computer instructions are stored, which, when executed by a processor, implements the above-mentioned target detection method for a high-resolution remote sensing image. The computer-readable storage medium can be an internal storage unit of any device with data processing capability as described in any of the previous embodiments, such as a hard disk or a memory. The computer-readable storage medium can also be an external storage device of the wind turbine, such as a plug-in hard disk, Smart Media Card (SMC), SD card, Flash Card and the like provided on the device. Further, the computer-readable storage medium can also include both internal storage units and external storage devices of any equipment with data processing capability. The computer-readable storage medium is used for storing the computer program and other programs and data required by any equipment with data processing capability, and can also be used for temporarily storing data that has been output or will be output.

Other embodiments of the present application will easily be conceived by those skilled in the art after considering the specification and practicing the disclosure herein. This application is intended to cover any variations, uses or adaptations of this application, which follow the general principles of this application and include common sense or common technical means in this technical field that are not disclosed in this application.

It should be understood that this application is not limited to the precise structure described above and shown in the drawings, and various modifications and changes can be made without departing from the scope thereof

What is claimed is:

1. A target detection method for a high-resolution remote sensing image, wherein the method is applied to a computing platform, and comprises:
    acquiring an original high-resolution remote sensing image from a sensor;
    acquiring, from a historical detection result, target information of an area corresponding to the original high-resolution remote sensing image and an expanded area of the area expanding around by a predetermined distance;
    adaptively partitioning the original high-resolution remote sensing image to obtain different cluster areas to be detected according to the target information, and obtaining an area required to be detected and an area not required to be detected;
    selecting a model of the area required to be detected, and generating a target detection scheme of the area required to be detected;
    executing the target detection scheme to obtain a detection result of the area required to be detected; and
    determining whether the computing platform has extra computing resources to detect the area not required to be detected, when the computing platform has extra computing resources, performing dynamic partition detection for the area not required to be detected to obtain a detection result of the area not required to be detected, and merging the detection result of the area required to be detected and the detection result of the area not required to be detected into a target detection result, when the computing platform does not have extra computing resources, taking the detection result of the area required to be detected as the target detection result.

2. The method according to claim 1, wherein before the step of acquiring the original high-resolution remote sensing image from the sensor, the method further comprises:
    off-line training target detection models suitable for different densities and sizes;
    measuring delay and detection accuracies of the off-line detection models on the computing platform; and
    loading the off-line detection models and the corresponding delay and detection accuracies on the computing platform.

3. The method according to claim 1, wherein after the step of obtaining the target detection result, the method further comprises:
    updating the historical detection result stored on the computing platform according to the target detection result.

4. The method according to claim 1, wherein the step of adaptively partitioning the original high-resolution remote sensing image to obtain different cluster areas to be detected according to the target information, and obtaining the area required to be detected and the area not required to be detected comprises:
    S21: performing clustering according to targets and positions of the targets, and calculating an initial value of a number of clustered categories, wherein the target information comprises the positions, sizes and categories of the targets;

S22: executing a clustering algorithm according to the initial value of the number of the clustered categories to obtain a corresponding number of clusters;

S23 constructing a bounding rectangle for each cluster, and calculating a side length of the rectangle and a density of the targets in the rectangle;

S24: updating the initial value of the number of the clustered categories and returning to step S22 for re-clustering when the side length of the rectangle exceeds a side length threshold and the density of the targets in the rectangle exceeds a density threshold; otherwise, selecting a model set capable of processing the density and the size according to the density and the size of the targets; and S25: areas where the targets may appear in the clusters by combining motion information of the targets, and setting the areas as cluster areas to be detected, wherein the area required to be detected is composed of all the cluster areas to be detected, an area which is not the area required to be detected in the original high-resolution remote sensing image is the area not required to be detected, and the motion information of the targets is stored on the computing platform.

5. The method according to claim 4, wherein the step of selecting the model of the area required to be detected and generating the target detection scheme of the area required to be detected comprises:

S31: selecting the model set capable of processing the density and the size according to the density and the size of the targets;

S32: evenly dividing one cluster area to be detected according to different input sizes of the models in the model set to generate at least one model combination feasible for the cluster area to be detected;

S33: executing S32 for each cluster area to be detected in the area required to be detected, and forming at least one model scheme after combining the models of all cluster areas to be detected;

S34: calculating an accuracy and a total delay of each model scheme for detecting the area required to be detected according to the accuracy and delay information of each model scheme; and S35: selecting a scheme the total delay of the scheme meets a delay limitation of the computing platform among all the model schemes as a target detection scheme of the area required to be detected in a manner of overall accuracy priority.

6. A target detection device for a high-resolution remote sensing image, wherein the device is applied to a computing platform, and comprises:

a memory;

one or more processors coupled to the memory, the one or more processors being configured to:

acquire an original high-resolution remote sensing image from a sensor;

acquire, from a historical detection result, target information of an area corresponding to the original high-resolution remote sensing image and an expanded area of the area expanding around by a predetermined distance;

adaptively partition the original high-resolution remote sensing image to obtain different cluster areas to be detected according to the target information, and then obtaining an area required to be detected and an area not required to be detected;

select a model of the area required to be detected and generating a target detection scheme of the area required to be detected;

execute the target detection scheme to obtain a detection result of the area required to be detected; and determine whether a computing platform has extra computing resources to detect the area not required to be detected, when the computing platform has extra computing resources, perform dynamic partition detection for the area not required to be detected to obtain a detection result of the area not required to be detected, and merging the detection result of the area required to be detected and the detection result of the area not required to be detected into a target detection result, when the computing platform does not have extra computing resources, taking the detection result of the area required to be detected as the target detection result.

7. Electronic equipment, comprising:

one or more processors;

a memory for storing one or more programs;

wherein when the one or more programs are executed by the one or more processors, the one or more processors implements the target detection method for a high-resolution remote sensing image according to claim 1.

8. A non-transitory computer-readable storage medium on which computer instructions are stored, wherein the instructions, when executed by a processor, implements the steps of the target detection method for a high-resolution remote sensing image according to claim 1.

* * * * *